Figure 3:
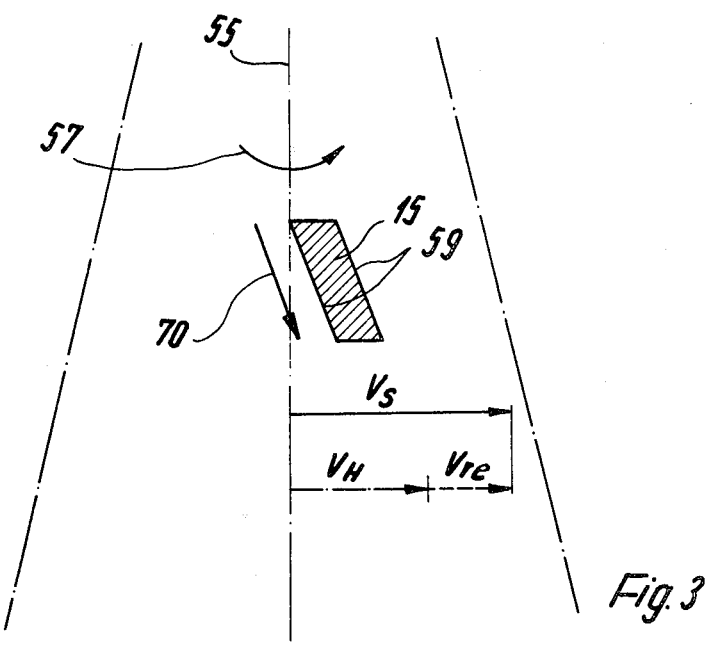

United States Patent [19]

van Olphen

[11] 4,177,722

[45] Dec. 11, 1979

[54] APPARATUS FOR THE CONTINUOUS SEPARATION OF THE FLESH OF FRUIT FROM THE PITS AND SKINS, ESPECIALLY OF THE PULP OF GRAPES FROM THEIR SEEDS AND SKINS

[75] Inventor: George C. van Olphen, Tucson, Ariz.

[73] Assignee: Westfalia Separator Aktiengesellschaft, Oelde Westfalen, Fed. Rep. of Germany

[21] Appl. No.: 867,211

[22] Filed: Jan. 5, 1978

[51] Int. Cl.$^2$ .......................... A23N 4/10; A23N 7/00
[52] U.S. Cl. ........................................ 99/540; 99/565
[58] Field of Search ................ 99/547, 548, 552, 554, 99/555, 562, 565, 566, 574, 580, 584, 540

[56] References Cited

U.S. PATENT DOCUMENTS

| | | | |
|---|---|---|---|
| 1,305,395 | 6/1919 | Mink | 99/565 |
| 2,500,981 | 3/1950 | Eymeric | 99/565 |
| 2,516,963 | 8/1950 | Derbenwick | 99/565 |

*Primary Examiner*—Edward J. McCarthy
*Attorney, Agent, or Firm*—Sprung, Felfe, Horn, Lynch & Kramer

[57] ABSTRACT

An improvement in apparatus suitable for continuous separation of the flesh of fruit from its pits and seeds comprising a rotor 13, a screen 19 opposite the rotor wherein the rotor has radial arms provided with hammer heads 15 for working of the fruit for passage of the flesh through the screen and collection of the pits and skins on the screen. The improvement comprises the screen being rotatably mounted, drive means for the rotor and the screen for driving the rotor and screen at circumferential speeds differing by at least 10%, the hammer heads having striking surfaces inclined so as to form an acute angle with the axis of rotation in the radial projection of the striking surfaces onto the axis, and the rotor and screen being conical and disposed in nested relation. The heads can be so inclined that they advance the fruit along the surface of the screen.

14 Claims, 7 Drawing Figures

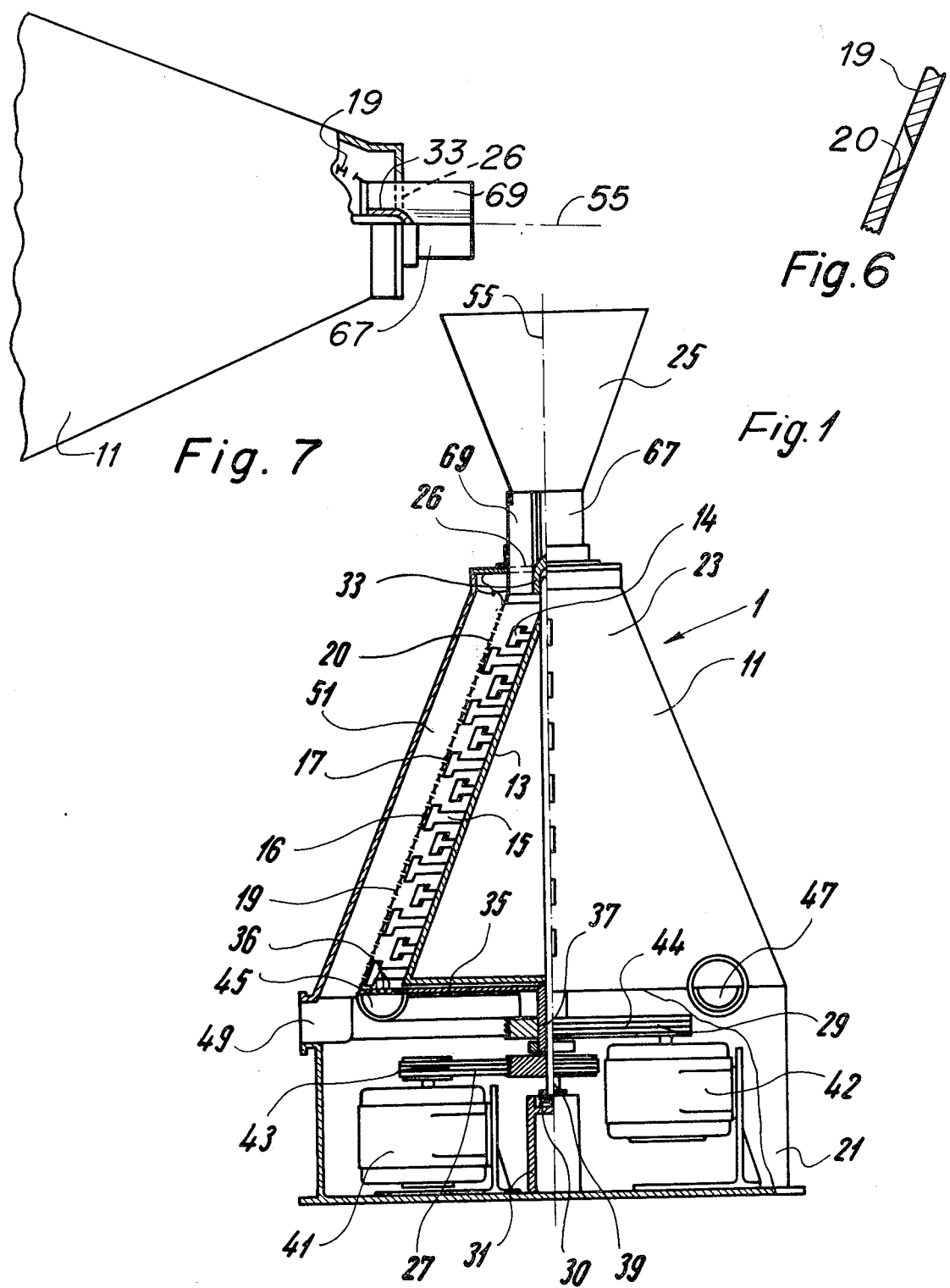

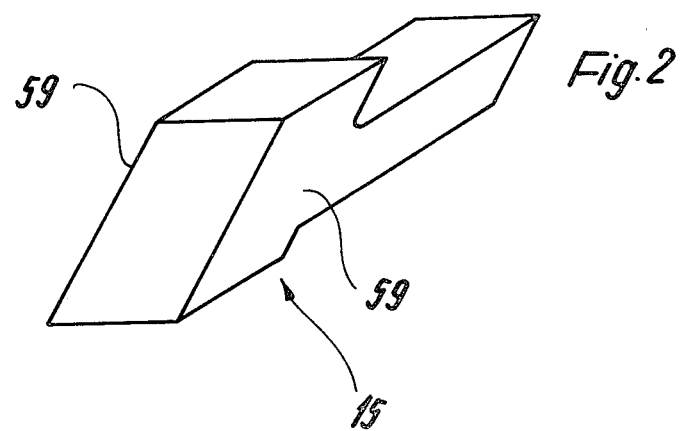
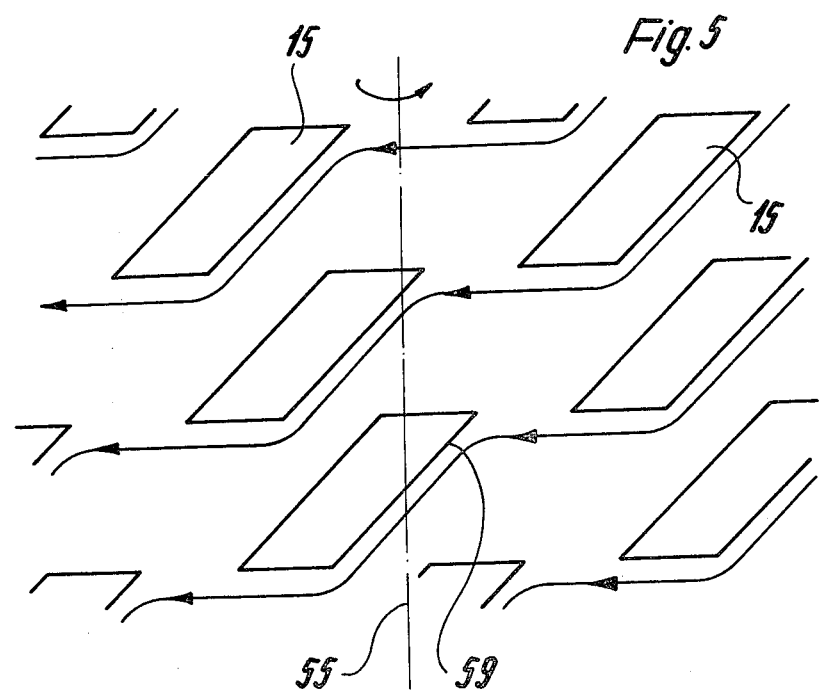

APPARATUS FOR THE CONTINUOUS SEPARATION OF THE FLESH OF FRUIT FROM THE PITS AND SKINS, ESPECIALLY OF THE PULP OF GRAPES FROM THEIR SEEDS AND SKINS

BACKGROUND

The invention relates to an apparatus for the continuous separation of the flesh of fruit from its pits and skin, especially the pulp of grapes from their seeds, having a rotor which is concentric with a screen and equipped with radial arms provided with hammer heads extending to the near vicinity of the screen.

An apparatus of this kind having a stationary cylindrical screen is known, in which, however, the pulp of the grapes accumulates outside of the screen and partially or completely plugs the screen openings. With this apparatus it is also impossible to achieve a perfect separation of the skin and seeds of grapes from the pulp.

THE INVENTION

The invention is addressed to the problem of designing an apparatus of the kind mentioned above, which in a simple manner and with little effort will separate the seeds and skins from the pulp of grapes, and in which the skins and seeds will be left with a low content of moisture.

This problem is solved in accordance with the invention in that, in addition to the rotor, the screen can be driven about the axis of rotation, the striking surfaces of the hammer heads form an acute angle with the axis of rotation in the radial projection thereof, the circumferential speed of the rotor differs by at least 10 percent from that of the revolving screen, and the rotor and the screen are of conical shape.

Due to the relative speed between the screen and the hammer heads of the rotor, the skin of the individual grapes is peeled from the pulp and rolled up, while the striking surfaces at an angle to the axis of rotation promote the transport of the seeds and skins to the discharge opening. In the movement of the fruit mass through the apparatus, a constantly increasing centrifugal force is exerted on the fruit mass due to the constantly increasing diameter, so that the fruit pulp is reliably discharged through the openings in the screen. In one advantageous embodiment of the apparatus of the invention, the screen is connected at one end to a support which is mounted on a hollow shaft which can be driven by a driving means. This results in an especially simple design of the apparatus. The hammer-headed arms of the rotor are advantageously disposed on the rotor in a staggered arrangement, so that the fruit mass or the seeds and skins are driven from one hammer head to the other.

An adjusting means can be provided which will make possible an axial relative movement between the rotor and the screen, for the purpose of adjusting the distance between the screen and the hammer heads such that the hammer heads will remove the fruit skins adhering to the inner surface of the screen.

The housing can be designed so as to have a base part in which the driving means are housed, and an upper part which can be mounted on the base part and which surrounds the screen and the rotor. It is desirable for the rotor to be held in bearings at both ends.

In the area of the small diameter of the screen, a cylindrical tube prolonging the screen can be disposed coaxially, in which axial ribs are provided. The axial ribs have the advantage that the fruit mass poured into the tube will be distributed evenly on the rotor and sieve. In this manner an unequal loading of the sieve will be prevented, which is especially important for a slight clearance between the screen and the hammer heads.

If the axis of rotation is made perpendicular, an especially simple design of the apparatus can be achieved. It is also possible, however, to make the axis of rotation horizontal.

In the base part of the housing it is advantageous to provide a channel for receiving the seeds and skins and to provide it with an outlet through an opening in the housing. The seeds and skins can then be discharged through this outlet. Furthermore, an opening can be provided in the housing for the withdrawal of the pulp of the fruit.

Since the skins are rendered virtually dry, they can easily be separated from the seeds, for example by air separation. The equipment for the separation of the skins and seeds can be contained at the foot of the apparatus of the invention.

Figure 4:
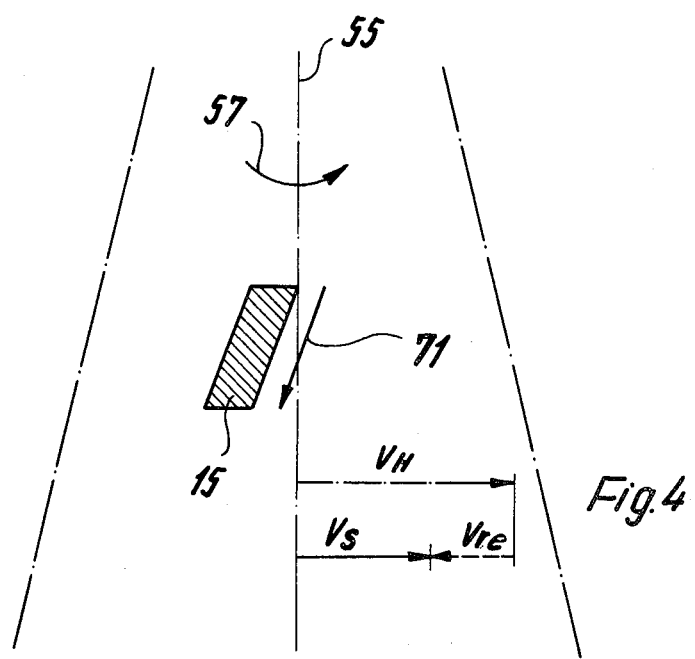

An example of the embodiment of the invention will now be described with the aid of the drawings, wherein FIG. 1 represents a partial cross section of an apparatus for the continuous separation of the flesh of fruit from its pits and from its skin, which has a vertical axis of rotation, FIG. 2 is a perspective view of a radial arm of the rotor, provided with a hammer head, FIG. 3 is a diagrammatic representation of the movements of the hammer head and screen and the forces resulting therefrom, for the case in which the screen speed is greater than the hammer head speed, FIG. 4 is a diagrammatic representation as in FIG. 3, but for the case in which the hammer head speed is greater than the screen speed, FIG. 5 is a developed, schematic representation of a number of the hammer heads and of the movement of the pits and skins, when the hammer heads are disposed as in FIG. 4, FIG. 6 is an enlarged view of a portion of the screen of the apparatus shown in FIG. 1, and FIG. 7 is a partial view of apparatus having a horizontally disposed axis.

The apparatus 1 represented in FIG. 1 has a conical rotor 13 rotatably mounted in a housing 11 and equipped with radial arms provided with hammer heads 15. These hammer heads 15 extend to a predeterminable distance 16 towards the inner surface 17 of a conical, rotatable screen 19. The housing 11 consists of a base part 21 and an upper part 23. The upper part 23 of the housing surrounds the screen 19 and serves simultaneously as the base for a tube 67 extending into the housing 11, on which a filling funnel 25 can be placed. Axial ribs 69 are mounted in tube 67, which distribute the grape mass and conduct it through apertures 26 into the space between the rotor 13 and the screen 19. In the base part 21 are housed the drive means 27 and 29 for the rotor 13 and the screen 19, which are advantageously separate from one another. The rotor 13 is mounted in a pedestal bearing 31 in the base part 21, and in a radial bearing 33 in the upper part 23. Through a disk-shaped support 35 the screen 19 is connected to a hollow shaft 37 which is mounted on the drive shaft 39 of the rotor 13. In the area between the screen 19 and the rotor 13, openings 36 are provided in the disk-shaped support, through which the pits and skins are carried into the channel 45. The driving means 27 and 29 comprise respectively variable speed motors 41 and 42 and v-belts 43 and 44 which drive the drive shaft 39 and the hollow shaft 37. In FIG. 1, the conical screen and rotor are in nested relation.

In the base part 21 of the housing there is provided a channel 45 from which the pits and skins can flow through an opening 47. Through an opening 49, the space 51 between the screen 19 and the wall of the upper part 23, into which the fruit flesh is delivered, can be emptied.

The hammer heads 15 are provided on the rotor 13 at an angle of about 20° to the left or to the right with reference to the axis of rotation.

The manner of operation of the apparatus will now be described with the aid of FIGS. 1 to 5.

The fruit mass is poured into the filling funnel 25. The axial ribs 69 disposed in tube 67 distribute and guide the fruit mass through the openings 26 between the revolving rotor 13 and the likewise revolving screen 19. The centrifugal force produced by the rotatory movement causes the fruit mass to be pressed against the inside surface 17 of the conical screen. The fruit mass of the grapes is divided up into flesh as well as seeds and skins by the action of the centrifugal force and under the effect of the radial arms with hammer heads 15 mounted on the rotor 13. By means of the centrifugal force, the flesh and the juice are forced through the openings 20 in the screen 19 and flow into the space 51 between the screen 19 and the housing 11. The flesh and the juice can flow down through an opening 49 in the housing 11 and are collected in suitable containers.

The openings 20 in the screen 19 are of such size that the seeds and skins cannot pass through them. Advantageously, as shown in FIG. 6 the openings 20 flare towards the outer surface of the screen 19, thereby facilitating the flow of the flesh of the fruit through them. The centrifugal force presses the skins and seeds against the inside surface 17 of the screen, and the hammer heads 15 provided on the rotor 13, which are disposed at a slight distance from the inside surface 17 of the screen, drive the seeds and skins into a channel 45 of semi-circular cross section. The seeds and skins can then emerge through an opening 47 and be collected in an appropriate container.

The rotatory speeds of the screen 19 and of the rotor 13 can be varied by the variable-speed motors 41 and 42. Thus, the circumferential speed and the relative speed between the screen and the rotor can be adapted to each particular type of grape and its characteristics.

Instead of the variable-speed motors 41 and 42, transmissions can also be provided which are variable stepwise and/or continuously, and which are driven by only one motor.

FIGS. 3 and 4 present a vectorial diagram of the components of velocity and movement produced by the rotatory movements of an individual hammer head 15. The direction of rotation 57 of the hammer heads 15 and of the screen 19 is the same, the screen speed in FIG. 3 being higher than that of the hammer heads 15. In FIG. 4, however, the hammer head speed is greater than the screen speed. The relative velocity $v_{re}$ formed by the screen velocity $v_s$ and the hammer head velocity $v_H$ brings it about that, by means of the striking surfaces 59 of the hammer heads 15, which are advantageously inclined at an angle of about 20° to the axis of rotation 55, the seeds and skins pressed by the centrifugal force against the inner surface 17 of the screen are removed therefrom and driven into the channel 45 disposed in the housing 11 between the screen 19 and the rotor 13. The direction of the inclination of the striking surfaces 59 will depend upon the direction of the relative movement. The relative velocity and its direction is a resultant of the hammer head velocity and the screen velocity. In FIG. 3 the movement of the seeds and skins is indicated by an arrow 70, while in FIG. 4 the reference number 71 is associated with the arrow indicating the movement of the seeds and skins.

The deflection of the seeds and skins for the operating conditions of FIG. 4 is represented in FIG. 5. Thus, the inclination of the striking surfaces 59 drives the seeds and skins into the channel 45.

To enable the distance 16 between the screen 19 and the hammer heads 15 to be adjusted, an adjusting means 30 is provided, for example, on the pedestal bearing 31. By this arrangement, the distance 16 between the screen 19 and the hammer heads 15 can be changed.

Whereas in the embodiment shown in FIG. 1, the machine has a vertical axis of rotation, alternatively, the axis can be horizontal as is shown in FIG. 7.

The apparatus can also be used, for example, for the separation of the flesh of cherries, plums, etc., from their pits and skins.

What is claimed is:

1. In apparatus suitable for continuous separation of the flesh of fruit from its pits and skin comprising a rotor, a screen concentrically disposed opposite the rotor, the rotor having radial arms provided with hammer heads for working of the fruit for passage of the flesh through the screen and collection of the pits and skins on the screen, the improvement which comprises, the screen being rotatably mounted, drive means for the rotor and the screen for driving the rotor and screen at circumferential speeds differing by at least 10%, the hammer heads having striking surfaces inclined so as to form an acute angle with the axis of rotation in the radial projection of the striking surfaces onto the axis, and the rotor and screen being conical and disposed in nested relation.

2. Apparatus of claim 1, wherein the striking surfaces are inclined at an angle of about 20° to the left or to the right with reference to the axis of rotation.

3. Apparatus of claim 1, comprising a housing for the screen and rotor having an inlet opening for the fruit at the apex end of the nested rotor and screen for introduction of the fruit between the rotor and screen.

4. Apparatus of claim 1, comprising an adjustment means for axial relative movement between the rotor and the screen for adjusting the distance between the inside surface of the screen and the hammer heads.

5. Apparatus of claim 1, wherein one end of the screen is joined to a support which is joined to a hollow shaft which can be driven through a driving means.

6. Apparatus of claim 1, wherein the hammer heads are in a staggered arrangement.

7. Apparatus of claim 1, wherein the screen openings are conically widened towards the outer surface of the screen to facilitate passage of the flesh through the screen.

8. Apparatus of claim 1, comprising a housing having an upper portion surrounding the rotor and screen and a base portion in which the drive means are housed.

9. Apparatus of claim 8, wherein the rotor is mounted in bearings at both ends thereof.

10. Apparatus of claim 1, comprising a cylindrical inlet tube for the fruit at the apex end of the rotor and screen for introduction of fruit between the rotor and screen, the inlet tube having axial ribs and projecting to within the screen.

11. Apparatus of claim 1, the axis of rotation of the rotor and screen being disposed vertically.

12. Apparatus of claim 8, wherein a channel is disposed in the base portion of the housing for receiving the pits and seeds.

13. Apparatus of claim 1, comprising a housing for the screen and rotor having an outlet opening for the withdrawal of the flesh.

14. Apparatus according to claim 3, having an inlet tube disposed in the inlet opening, the inlet tube having axial ribs projecting to within the screen, the axis of rotation being disposed horizontally.

* * * * *